United States Patent
Randall et al.

(10) Patent No.: US 7,665,021 B2
(45) Date of Patent: Feb. 16, 2010

(54) SYSTEM AND METHOD FOR SCRIPT BASED EVENT TIMING

(75) Inventors: Mark Randall, Folsom, CA (US); Thomas Lee Ocel, Sacramento, CA (US); Stephan Schaem, Fair Oaks, CA (US); Stephan Bouchard, Folsom, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1561 days.

(21) Appl. No.: 10/291,311

(22) Filed: Nov. 8, 2002

(65) Prior Publication Data

US 2003/0090507 A1 May 15, 2003

Related U.S. Application Data

(60) Provisional application No. 60/338,141, filed on Nov. 9, 2001.

(51) Int. Cl.
*G06F 715/716* (2006.01)
(52) U.S. Cl. .................. 715/716; 715/726; 715/731; 725/135
(58) Field of Classification Search ............. 725/39, 725/135; 715/731, 716; 345/723, 731
See application file for complete search history.

(56) References Cited

U.S. PATENT DOCUMENTS

| | | | | |
|---|---|---|---|---|
| 5,422,521 A | * | 6/1995 | Neer et al. ................ 307/119 |
| 5,524,193 A | * | 6/1996 | Covington et al. ......... 715/512 |
| 6,081,262 A | * | 6/2000 | Gill et al. ............... 715/500.1 |
| 6,219,032 B1 | * | 4/2001 | Rosenberg et al. ......... 345/157 |
| 6,832,386 B1 | * | 12/2004 | Jerding et al. ............... 725/39 |
| 6,952,221 B1 | * | 10/2005 | Holtz et al. ............... 715/723 |
| 2003/0184598 A1 | * | 10/2003 | Graham .................... 345/838 |
| 2004/0080528 A1 | * | 4/2004 | Rand et al. ................ 345/738 |
| 2005/0257164 A1 | * | 11/2005 | Iwamura .................... 715/771 |

* cited by examiner

*Primary Examiner*—Brian T Pendleton
*Assistant Examiner*—Nnenna N Ekpo
(74) *Attorney, Agent, or Firm*—Fish & Richardson P.C.

(57) ABSTRACT

An integrated and interactive real-time media creation system and method are disclosed that visually link the order and execution of media events to a scrolling on-screen text script that is spoken. As the user speaks, the on-screen text script scrolls under user control. Adjacent to the script text are visual images which represent associated media events. The visual images maintain a constant relative spatial relationship with the text. When the text reaches a predetermined region of the screen it is spoken out loud by the user and the media events are caused to occur at that time. The invention allows a single user with a single personal computer to easily self-produce a multimedia presentation of undetermined and variable length, featuring media events appropriately inserted in real-time without the assistance of a director or other operator.

30 Claims, 2 Drawing Sheets

US 7,665,021 B2

SYSTEM AND METHOD FOR SCRIPT BASED EVENT TIMING

CROSS-REFERENCE TO RELATED APPLICATION

The present application claims the benefit of U.S. provisional patent application No. 60/338,141, filed Nov. 9, 2001 and entitled "System and Method for Script Based Event Timing," which is hereby incorporated by reference.

BACKGROUND OF THE INVENTION

1. Field of the Invention

The present invention relates generally to multimedia creation and more specifically, to a system and method for creating visual presentations based on a text script.

2. Description of Related Art

Conventional multimedia creation, which involves manipulating video and audio clips, has primarily used video production equipment based on television production techniques. Basic video production techniques are described in the "Television Production Handbook," Zettl, 1997 Wadsworth Publishing Company, which is incorporated herein by reference. The equipment and techniques generally use a similar paradigm to sequence events. The paradigm is a timeline where events, which include but are not limited to, effects, titles, graphics and media clips, are ordered in linear fashion along a time scale marked by seconds and or frames. On the timelines, events are ordered and executed depending on their relationship to said time scale based on the associated seconds and frames.

This approach allows events to be executed at a given pre-specified time. While suitable for orchestrating predictable presentations or editing presentations after the fact, this approach is poor for live presentations or those which are recorded live. In particular, presentations involving a live human speaker who by nature can frequently vary his or her pace of speaking are not well-served by conventional approaches. Previously, addressing these shortcomings involved having a separate operator or director trigger media events manually to keep the media events synchronized with the variable pace inherent in a live presentation of spoken material. This is the process by which live television newscasts are produced. For example, a professional director controls equipment and coordinates with other equipment operators in the sequencing and insertion of real-time media events into the television program as it happens. Recent improvements in professional newscast creation provide for eliminating additional operators, allowing the director to remotely control and trigger media events from a variety of separate production devices.

With the advent of low-cost webcams and the Internet many live multimedia presentations are now created on a personal computer by a single individual and transmitted over the Internet for business and or educational purposes. In this case all creation, playback, recording and transmitting functions are integrated in one low-cost device, the personal computer. Hence it is not feasible, due to space and economic factors, to have a separate director coordinate and sequence the real-time insertion of media events on behalf of the user appearing in the presentation. The predetermined timeline approach is not effective in such cases. Although the user can create a timeline in advance, the presentation itself is delivered and created in real-time and thus the pacing is variable due to the participation of a live human speaker. The sole user is presently left with the choice of doing without media events in their live presentation, securing the services of a separate director, or simultaneously filling the roles of presenter and director during the presentation. While the latter case is optimal, it presently requires the user to speak and while speaking simultaneously trigger the insertion of media events into the presentation at the appropriate times. Performing these tasks correctly and reliably while simultaneously delivering an effective verbal presentation is difficult for most users and not possible for many.

Therefore, a new system and method are needed to address the above problems.

SUMMARY OF THE INVENTION

The present invention solves the above identified problems with conventional systems by providing an integrated and interactive real-time media creation system and method that visually links the order and execution of media events, which can include but are not limited to, effects, titles, graphics and media clips, to a scrolling on-screen text script that is spoken. The invention creates a real-time media presentation in an interactive fashion while the user speaks. In one embodiment, the invention is based on a personal computer which displays the script and events on a display monitor while using one or more connected cameras and microphones as input. As the user speaks, the on-screen text script scrolls under user control. The user may speed up, slow down or entirely stop the scrolling of the script during the creation of the presentation.

Adjacent to the script text are visual images which represent and are associated with certain media events. Prior to commencing the presentation, the user positions the visual images adjacent to the words in the script that the associated media events should appear with in the presentation. As the script scrolls on the screen, the visual images maintain a constant relative spatial relationship with the text. When the text reaches a predetermined area of the screen it is spoken out loud by the user, digitized and then recorded by the system. Alternatively, the presentation may be transmitted at the same time it is recorded. When the visual images representing the media events reach the predetermined screen area, the associated media events are inserted at that time and are transmitted by the system, hence maintaining synchronization with the variable pace of the spoken presentation.

In this way, the present invention allows a single user with a single personal computer to easily self-produce a multimedia presentation of undetermined and variable length, featuring media events appropriately inserted in real-time without the assistance of a director or other operator. The present invention allows the user to create the presentation without having to decide or determine the amount of time between, or duration of, any individual elements or the combined end result. No time-based estimates or restrictions are necessary. At the moment the presentation is commenced neither the system nor the user need know what the actual time duration of the final presentation will be. The presentation is created entirely "on the fly" preserving spontaneity and the natural pacing of the user's speech. During the presentation, the user need only focus on delivering the spoken script into the microphone and camera while controlling the scrolling speed of the text script being read and spoken. The system causes the media events to be inserted into the presentation at the desired moments based on their on-screen visual relationship to the script text.

In one embodiment the user controls the script scrolling speed with a computer input device such as a keyboard or mouse. In another embodiment the script scrolling speed is controlled with a computer joystick or a computer foot pedal.

The invention is not dependant on the method used for user input so long as the user has a way to interactively modulate the speed of the on-screen scrolling text.

Definition of Terms

"Media Events"—Elements of media which can include, but are not limited to, visual effects, titles, graphics and media clips such as video clips and audio.

DETAILED DESCRIPTION OF THE PREFERRED EMBODIMENTS

Figure 1:
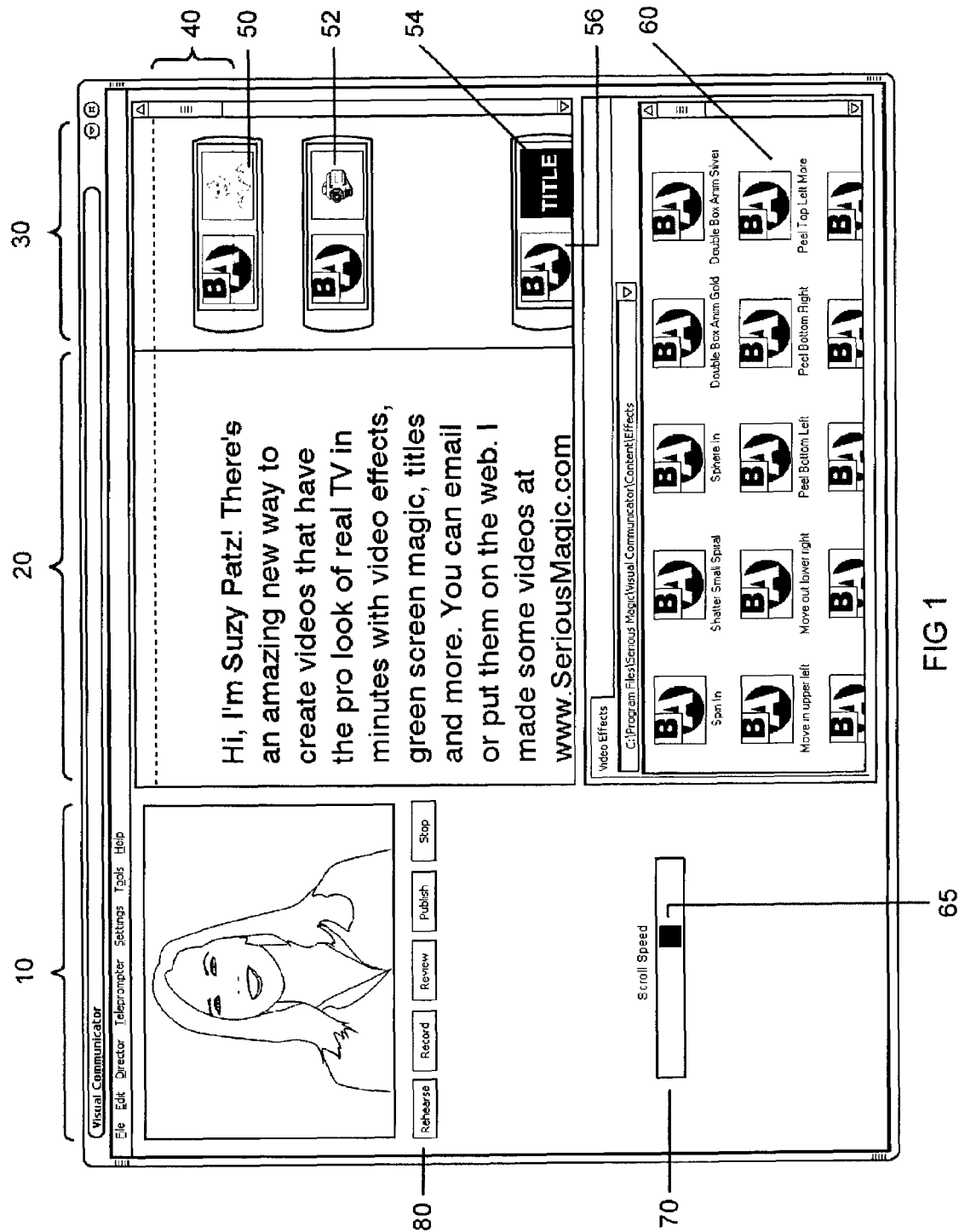
FIG. 1 is a graphic of a graphical user interface illustrating one embodiment of the present invention.

The present invention will be more completely understood through the following detailed description which should be read in conjunction with the attached drawings in which similar reference numbers indicate similar structures.

While there are many methods available for sequencing and triggering media events for a presentation, when the presentation is being performed in real-time with a live presenter, triggering media events at the proper time remains a complex task usually requiring at least one other person to operate and direct. In the present invention, a novel method is introduced allowing a single user to perform the presentation in real-time without concern for any parameter other than controlling the variable scrolling of the text script.

One embodiment of this invention will now be described in more detail. The present invention may be implemented using a digital computer. It should be understood that one or more input devices may be connected to the computer system. Example input devices include a keyboard, keypad, mouse, trackball, foot pedal, webcam and audio input. It should be understood that one or more output devices may be connected to the computer system. Example output devices include a cathode ray tube (CRT) display, liquid crystal display (LCD), communication devices, such as a cable modem, network connection and audio output. To enable input of motion video information in an analog form, this computer system also may have a video capture card for receiving a video signal from a camcorder or the like. The video capture card may receive and may output composite video and S-video. It should be understood that the invention is not limited to the particular input or output devices used in combination with the computer system or to those described herein.

The computer system may be a general purpose computer system, which is programmable using a high level computer programming language, such as "C++" or a low-level language such as "assembly language." The computer system may also be implemented using specially programmed, special purpose hardware. In a general purpose computer system, the processor is typically a commercially available processor, such as the Pentium microprocessor from Intel. Many other processors are also available. Such a processor executes a program called an operating system, such as the Windows operating system from Microsoft, which controls the execution of other computer programs and provides scheduling, debugging, input output control, accounting compilation, storage assignment, data management and memory management, and communication control and related services.

The processor and operating system define a computer platform for which application programs in high level programming languages are written. It should be understood that the invention is not limited to a particular computer platform, particular operating system, particular processor, or particular programming language. Additionally, the computer system may be a multi-processor computer system or may include multiple computers connected over a computer network. An embodiment of the present invention is implemented using an Intel Pentium 4 processor and a Windows XP operating system. The computer system may also include additional software for managing input, output, compression and decompression of video streams, such as Microsoft's Windows Media 8 and DirectShow.

Such a platform can be used to implement a graphical user interface and related functions in accordance with the invention. FIG. 1 shows a view of a graphical user interface in one embodiment of the invention. The interface shown in FIG. 1 would typically occupy substantially all of the visible display area, unless otherwise repositioned by the user with the host operating system.

Figure 2:
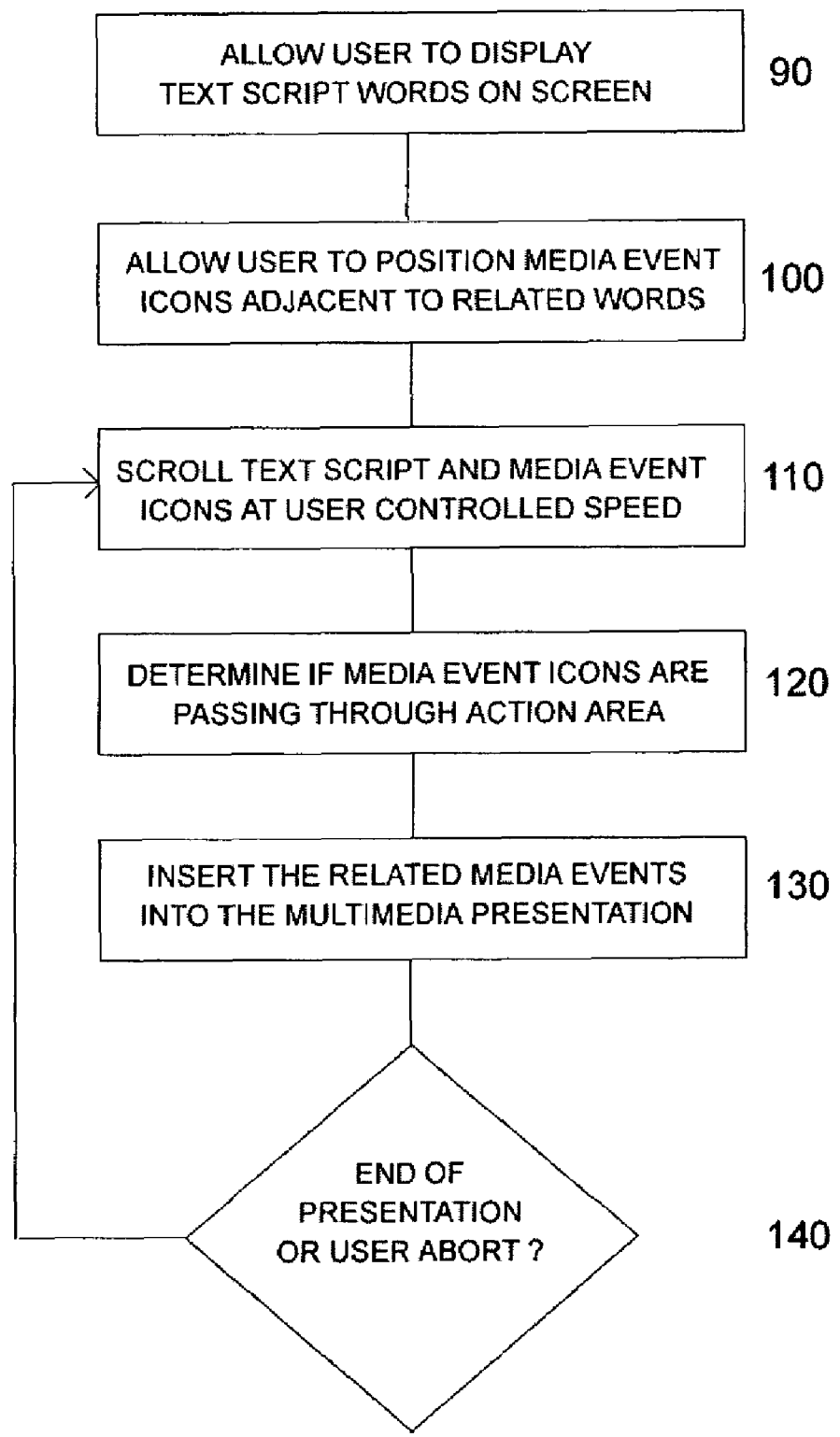
FIG. 2 is a flowchart describing how media events are synchronized with script text.

The graphical user interface and its functionality will now be described in more detail. Within the display area, a text script area referred to as the "teleprompter" 20 is shown. Within this area the text script is displayed to the user. As is represented in FIG. 2. at 90, the user is allowed to display text script words on the screen. The user may type text directly into this area but may also load it from elsewhere in the computer via a file loading operation. The user may also insert text into the teleprompter by a cut-and-paste operation. The text may be resized by the user and an automatic line wrapping feature may also be provided. The size of the teleprompter area may be made smaller or larger by the user.

To the right of the teleprompter is an area for media events referred as the "event area" 30. The user may place graphical icons representing media events in the event area by using drag-and-drop operations with an input device. The content folder is used to browse and select various media events, including but not limited to, transitions, video effects, titles, still photos, video clips and audio clips. The user may drag-and-drop media events from the content folder 60 but may also drag-and-drop media events from other locations such as another software application and the computer's operating system. The user places media events in the "event area" adjacent to text words in the teleprompter which the user wishes the media events to appear with in the presentation.

In FIG. 1 three media events are currently visible in the event area 50, 52, 54. 50 is a graphical icon representing a still graphic of a person. 52 is a graphical icon representing a live camera input to the computer. 54 is a title graphic. In a preferred embodiment the graphical icons are a reduced representation of the content of the media event. For example, 54 shows media which is a title graphic comprising the word "TITLE" in white text on a field of black. Media are introduced into the presentation with a transition. Examples of transitions are cuts, dissolves, moves and spins, which are commonly used for video and graphical events. For audio events the most common transitions are a fade in and fade out.

It is desirable to also represent transitions graphically so that the user can estimate in advance the final appearance of the presentation. In a preferred embodiment the transition to be used to introduce a media event in the presentation is shown to the left of the media event's graphical icon. Together, the media 54 and the transition to be used with that media 56 comprise a media event. This is illustrated by 56 which is a move transition which will move the title 54 onto the screen from the upper left corner. The graphical representation of a transition seen in 56 is made using a letter "A" in a circle to represent the present content of the presentation and a letter "B" in a square to represent the media that will be introduced to the presentation by the transition. In a similar fashion to that used with media, the user may browse the content folder 60 to select transitions and place them in the event area 30 by dragging-and-dropping with an input device.

During the presentation the teleprompter 20 and event area 30 scroll upward toward the top of the interface in synchronization. There is a predetermined area 40 which is a horizontal rectangular region. This predetermined area is referred to as an "Action Area." The action area can be graphically represented in a variety of ways. In one embodiment it is a semi-transparent graphical overlay on the region tinting everything in and under the region in a light shade of red. Denoting the action area with a semi-transparent graphical overlay is desirable because it makes it easy for the user to determine when words in the teleprompter are passing through the region while not impairing the user's ability to read said words.

The presentation output is shown to the user in an on-screen area referred to as a preview/review area 10. The preview/review area shows a proportionally reduced representation of the full screen output of the presentation. The control buttons 80 are provided for the user to rehearse the presentation, initiate the presentation and review the result presentation. The Scroll Speed slider 70 is an input slider of the type commonly found in computer graphical interfaces. The knob 65 within the slider may be moved to the left or right by an input device. When moved to the right, the scrolling speed of the teleprompter and event area increases. When moved to the left, the scrolling speed of the teleprompter and event area decreases. By using a mouse the user can directly click on the knob and move it left and right. Clicking to the left of the knob causes the knob to move left one increment. Clicking to the right of the knob causes the knob to move right one increment. The scrolling speed can also be controlled by other input devices, including but not limited to, a keyboard, keypad, joystick, trackball and foot pedal. Any input device that allows the user to easily increase and decrease a computer-readable parameter, preferably without requiring eye contact, would be suitable for this aspect of the invention.

Referring to FIG. 2, when the user has completed entering the text script into the teleprompter, the media events are placed in the event area as reflected at 100. As each media event is placed, they are horizontally constrained by a preferred embodiment of the invention into a column. The vertical alignment is entirely user determined and may partially cross over a line of text or be between two lines of text. The association between words in the teleprompter script and a media event is made by the spatial relationship established when the user drops the media event in the event area. In this way, users obtain subtle yet consistent timing distinctions based on the intuitive visual alignment they have arranged.

During the presentation itself, the teleprompter text script and event area are scrolled together as one unit as referred to in 110. The speed is modulated under user control as discussed above. At 120 a check is made to determine if a media event has reached the action area. In a preferred embodiment the precise trigger point is the top of the action area. This determination is made by using X, Y screen coordinates now common to most computer applications and operating systems. The Y coordinate value for the top edge of the action area is stored and compared with the Y coordinate value for the top edge of each media event in the presentation. When these values are equal, the corresponding media event is triggered and inserted into the presentation as reflected in 130. The X values are ignored.

This is continued until the presentation is finished or the user aborts the presentation. Completion is determined by checking to see if any words or media events remain that have not yet scrolled through the action area. In an embodiment, aborting the presentation is done with the Escape key or by clicking the mouse on the Stop button shown at 80.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

We claim:

1. A computer-implemented method for producing a real-time presentation of variable length and inserting media events in same, comprising:

displaying a text script on a display;

receiving input from a user positioning a plurality of visual images associated with a plurality of media events adjacent to said text script in a scrollable portion of said display to establish a spatial relationship between said plurality of visual images and said text script, such that each visual image's position corresponds to one or more words in said text script with which said associated media event is to begin during a presentation;

scrolling said text script on said display while maintaining said spatial relationship between said text script and said visual images;

causing said media events associated with said visual images to begin approximately upon the corresponding one or more words of the text script scrolling through a predetermined region of said display during said presentation; and generating said presentation, including audio information corresponding to the user speaking at least a portion of said text script.

2. The method of claim 1, further comprising typing said text script onto said display.

3. The method of claim 1, further comprising placing said text script onto said display from another location within a processing unit.

4. The method of claim 1, further comprising varying a scrolling speed of said text script based on user input.

5. The method of claim 4, further comprising varying said scrolling speed based on input to one of a computer mouse, a computer joystick, a computer keyboard, and a foot pedal.

6. The method of claim 1, wherein said predetermined region is in the approximate shape of a horizontal rectangle.

7. A computer program product, encoded on a computer-readable medium, operable to cause data processing apparatus to perform operations comprising:

displaying a text script on a display;

receiving input from a user positioning a plurality of graphical icons associated with a plurality of media events adjacent to said text script in a scrollable portion of said display to establish a spatial relationship between said plurality of visual images and said text script, such that each graphical icon's position corresponds to one or more words in said text script with which said associated media event is to begin during a presentation;

scrolling said text script on said display while maintaining said spatial relationship between said text script and said graphical icons;

causing said media events associated with said graphical icons to begin approximately upon the corresponding one or more words of the text script scrolling through a predetermined region of said display during said presentation; and generating said presentation, including audio information corresponding to the user speaking at least a portion of said text script.

8. The computer program product of claim 7, further comprising instructions operable to cause a programmable processor to perform operations comprising receiving said text script as typed input.

9. The computer program product of claim 7, further comprising instructions operable to cause a programmable processor to perform operations comprising copying said text script from another location within a processing unit.

10. The computer program product of claim 7, further comprising instructions operable to cause a programmable processor to perform operations comprising varying a scrolling speed of said text script based on user input.

11. The computer program product of claim 10, further comprising instructions operable to cause a programmable processor to perform operations comprising varying said scrolling speed based on input to one of a computer mouse, a computer joystick, a computer keyboard, and a foot pedal.

12. The computer program product of claim 7, wherein said predetermined region is in the approximate shape of a horizontal rectangle.

13. A system comprising:
a display;
a user interface, including a control device and a microphone; and
processor electronics configured to perform operations comprising:
displaying a text script on a display;
receiving input from the control device positioning a plurality of visual images associated with a plurality of media events adjacent to the text script in a scrollable portion of the display to establish a spatial relationship between the plurality of visual images and the text script, such that the position of each visual image corresponds to one or more words in the text script with which the associated media event is to begin during a presentation;
scrolling the text script on the display while maintaining the spatial relationship between the text script and the visual images;
causing the media events associated with the visual images to begin approximately upon the corresponding one or more words of the text script scrolling through a predetermined region of the display during the presentation; and
generating the presentation, including audio information corresponding to the user speaking at least a portion of the text script.

14. The system of claim 13, wherein the processor electronics are further configured to perform operations comprising:
receiving the text script as typed input through the user interface.

15. The system of claim 13, wherein the processor electronics are further configured to perform operations comprising:
loading the text script from a location within a storage device.

16. The system of claim 13, wherein the processor electronics are further configured to perform operations comprising:
varying a scrolling speed of the text script based on input received through the user interface.

17. The system of claim 16, wherein the control device comprises one of a computer mouse, a computer joystick, a computer keyboard, and a foot pedal.

18. The system of claim 13, wherein the predetermined region of the display comprises a rectangle, wherein the width is greater than or equal to the height.

19. The system of claim 13, further comprising:
a computer-readable medium configured to store a content folder including one or more of the plurality of media events.

20. The method of claim 1, wherein receiving input from the user positioning the plurality of visual images further comprises:
receiving input selecting at least one of the plurality of media events from a content folder.

21. The computer program product of claim 7, wherein the instructions operable to cause a programmable processor to perform operations comprising receiving input from a user positioning a plurality of graphical icons are further operable to perform operations comprising:
receiving input selecting at least one of the plurality of media events from a content folder.

22. The method of claim 1, wherein at least one of the plurality of visual images graphically represents content of the corresponding media event.

23. The method of claim 1, further comprising:
receiving input associating a transition with one of the plurality of media events, wherein a transition indicator is displayed in conjunction with the visual image associated with the media event.

24. The method of claim 23, wherein generating said presentation further comprises:
inserting the media event into the presentation in accordance with the associated transition.

25. The computer program product of claim 7, wherein at least one of the plurality of visual images graphically represents content of the corresponding media event.

26. The computer program product of claim 7, further comprising instructions operable to cause a programmable processor to perform operations comprising:
receiving input associating a transition with one of the plurality of media events; and
presenting a transition indicator in conjunction with the visual image associated with the media event.

27. The computer program product of claim 26, wherein the instructions operable to cause a programmable processor to perform operations comprising generating said presentation are further operable to perform operations comprising:
inserting the media event into the presentation in accordance with the associated transition.

28. The system of claim 13, wherein at least one of the plurality of visual images graphically represents content of the corresponding media event.

29. The system of claim 13, wherein the processor electronics are further configured to perform operations comprising:
receiving input from the control device associating a transition with one of the plurality of media events; and
displaying a transition indicator in conjunction with the visual image associated with the media event.

30. The system of claim 29, wherein the processor electronics configured to perform operations comprising generating said presentation are further configured to perform operations comprising:
inserting the media event into the presentation in accordance with the associated transition.

* * * * *

UNITED STATES PATENT AND TRADEMARK OFFICE
CERTIFICATE OF CORRECTION

PATENT NO. : 7,665,021 B2 Page 1 of 1
APPLICATION NO. : 10/291311
DATED : February 16, 2010
INVENTOR(S) : Randall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2231 days.

Signed and Sealed this

Seventh Day of December, 2010

David J. Kappos
*Director of the United States Patent and Trademark Office*